United States Patent [19]

Fukuchi

[11] Patent Number: 4,485,885

[45] Date of Patent: Dec. 4, 1984

[54] REAR SUSPENSION SYSTEM FOR TWO-WHEELED VEHICLES

[75] Inventor: Kiyoshi Fukuchi, Saitama, Japan

[73] Assignee: Honda Giken Kogyo Kabushiki Kaisha, Tokyo, Japan

[21] Appl. No.: 450,469

[22] Filed: Dec. 16, 1982

[30] Foreign Application Priority Data

Dec. 23, 1981 [JP] Japan .................. 56-214767
Jan. 12, 1982 [JP] Japan .................. 57-3001
Jan. 14, 1982 [JP] Japan .................. 57-4262
Jan. 14, 1982 [JP] Japan .................. 57-4263
Jul. 23, 1982 [JP] Japan .................. 57-129215
Jul. 26, 1982 [JP] Japan .................. 57-130169

[51] Int. Cl.³ .................................... B62K 25/20
[52] U.S. Cl. ............................. 180/227; 280/284
[58] Field of Search ............... 180/227; 280/283, 284, 280/716; 267/63 R

[56] References Cited

FOREIGN PATENT DOCUMENTS

| 29980 | 10/1958 | Finland ..................... 280/284 |
| 1135966 | 12/1956 | France ..................... 280/284 |
| 1209029 | 9/1959 | France ..................... 180/227 |
| 2067143 | 7/1981 | United Kingdom ......... 280/284 |

Primary Examiner—John A. Pekar
Attorney, Agent, or Firm—Irving M. Weiner; Pamela S. Burt; Anthony L. Cupoli

[57] ABSTRACT

A rear suspension system in a two-wheeled vehicle having a body frame, a front wheel and a rear wheel. The rear suspension system comprises a rear fork member having a front end pivotably connected to the body frame and a rear end which rotatably supports the rear wheel, and an elastic band member stretched between the rear fork member and the body frame. With such arrangement, favorable comfort characteristics are ensured while at the same time weight is reduced.

18 Claims, 18 Drawing Figures

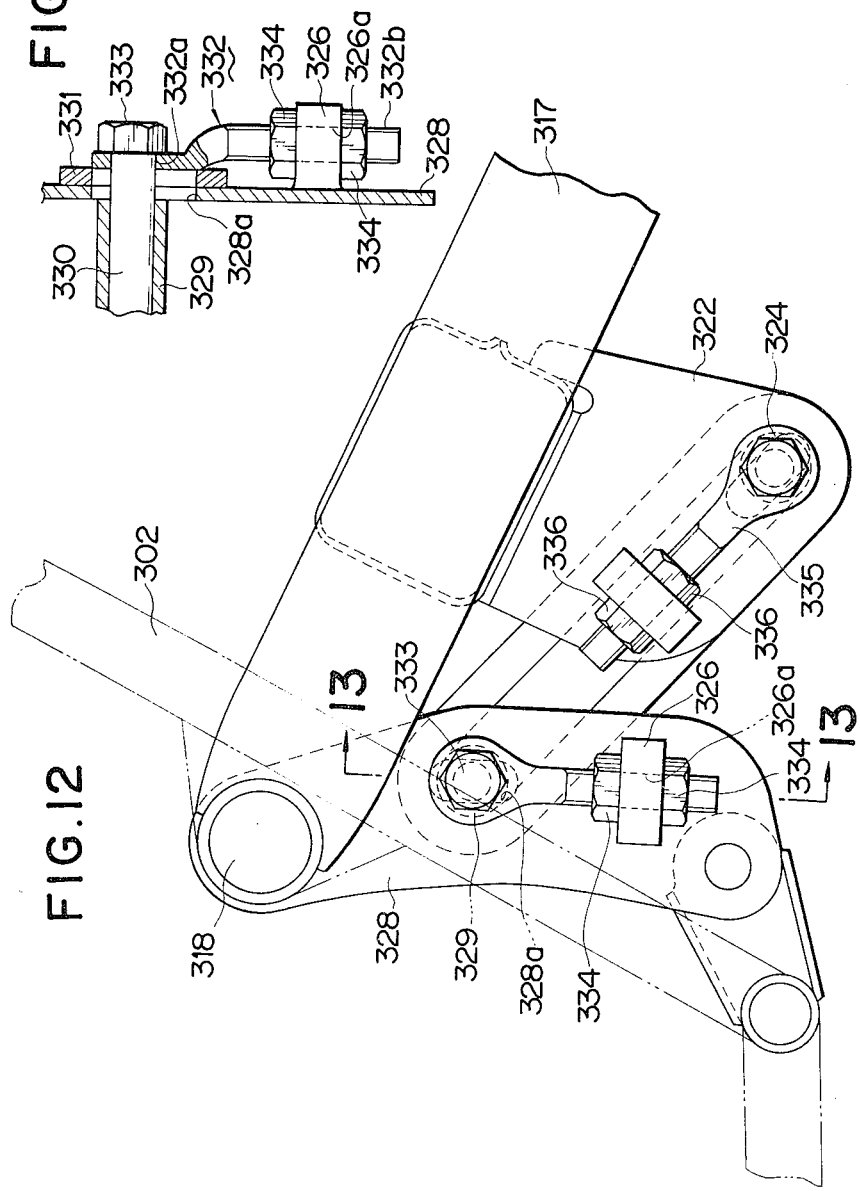

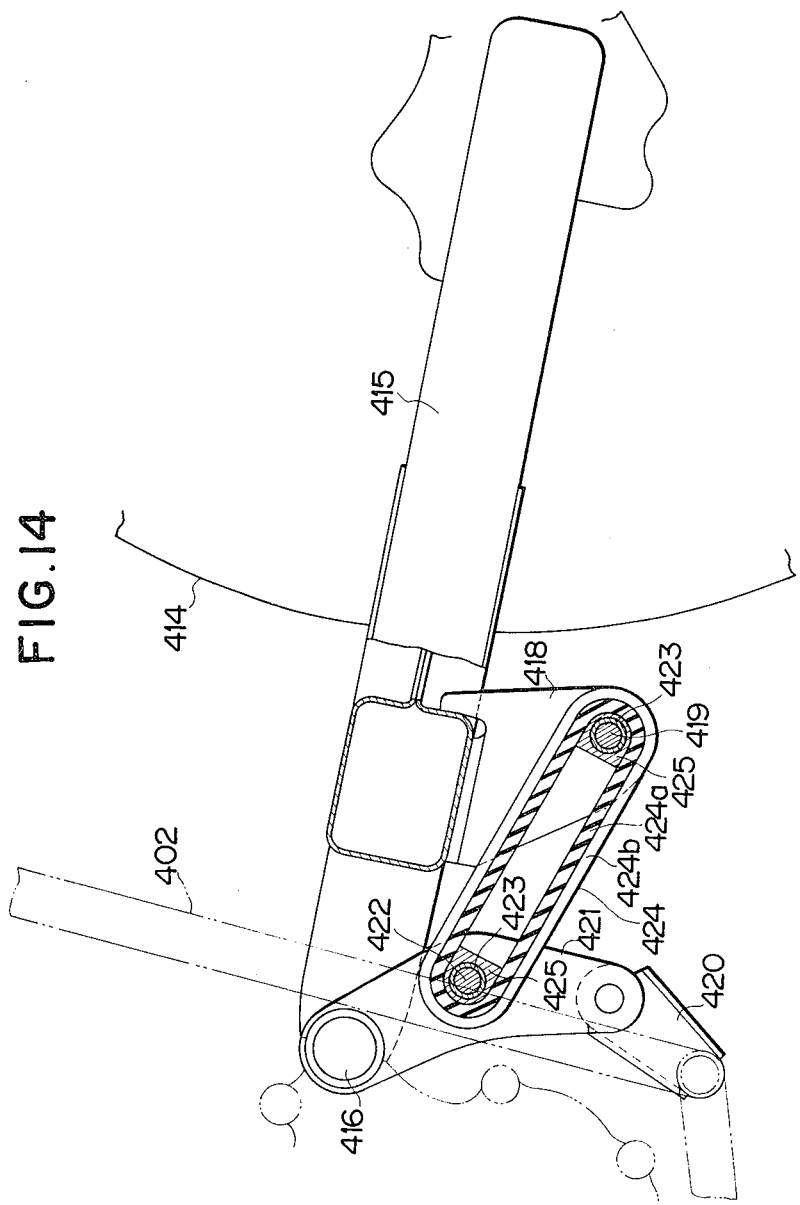

REAR SUSPENSION SYSTEM FOR TWO-WHEELED VEHICLES

BACKGROUND OF THE INVENTION

1. Field of the Invention

The present invention relates generally to a rear suspension system for two-wheeled vehicles. More particularly, the invention relates to a rear suspension system for two-wheeled vehicles such as motorcycles.

2. Description of Relevant Art

In two-wheeled vehicles, such as motorcycles for example, the rear wheel is suspended by means of a damper, and vibrations of the rear wheel are effectively absorbed and cushioned by a cushioning action of the damper, whereby improved comfort of the rider(s) is attained.

Heretofore, there has been known a damper unit comprising a shock absorber which exhibits a damping action by utilization of resistance of a fluid such as oil, and a spring which functions to store external vibrations as elastic energy. Recently, however, there has been a growing demand for reduction in weight of two-wheeled vehicles, and such demand has come to be directed in part to the aforesaid type of damper.

The present invention provides a rear suspension system which effectively meets the foregoing demand for reduced weight of two-wheeled vehicles, while at the same time providing enhanced comfort characteristics.

SUMMARY OF THE INVENTION

The present invention provides a rear suspension system in a two-wheeled vehicle having a vehicle body frame and a rear wheel, which suspension system comprises a rear fork member pivotably secured to the vehicle body frame at its front portion and pivotably supporting the rear wheel at its rear portion, and a ring-like elastic band member stretched between the rear fork member and the vehicle body frame.

It is a primary object of the present invention to provide a rear suspension system for two-wheeled vehicles which attains enhanced comfort characteristics as well as reduction of weight.

Preferred embodiments of the present invention will be described in detail hereinbelow with reference to the accompanying drawings, from which further features, objects and advantages of the invention will become apparent.

BRIEF DESCRIPTION OF THE DRAWINGS

FIG. 12 is a sectional side view of a principal portion of a rear suspension system including an elastic band in a motorcycle, according to a fourth embodiment of the present invention.

FIG. 13 is a sectional view taken along line 13—13 of FIG. 12.

FIG. 14 is a side view of a principal portion of a rear suspension system including a bearing mechanism in a motorcycle, according to a fifth embodiment of the present invention.

DETAILED DESCRIPTION OF PREFERRED EMBODIMENTS

Figure 1:
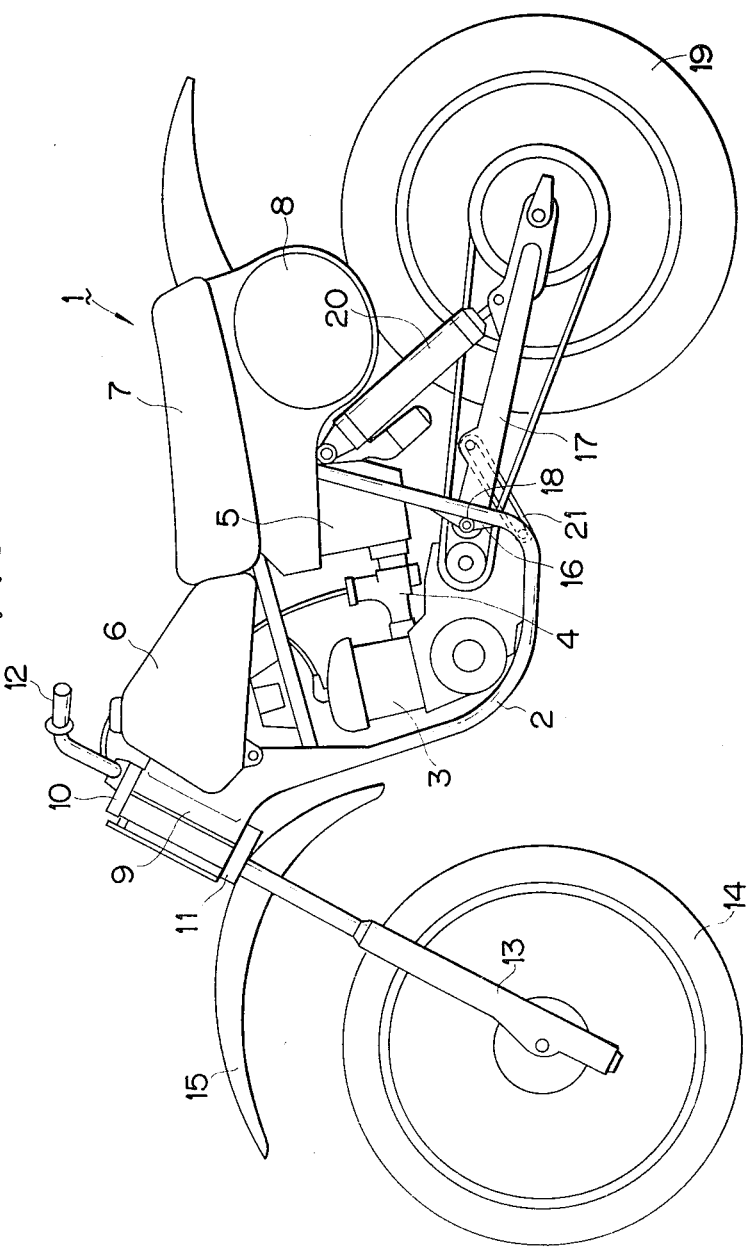
FIG. 1 is a side view of a motorcycle having a rear suspension system in accordance with a first embodiment of the present invention.

With reference to FIGS. 1 through 4 and particularly to FIG. 1, there is shown a motorcycle 1 which has a body frame 2, with an engine 3 being mounted on the body frame 2, and a carburetor 4 and an air cleaner 5 being connected to the engine 3. Above the engine 3 is mounted a fuel tank 6, and behind the fuel tank 6 is mounted a seat 7. Side covers 8 extend downwardly on both sides of the seat 7.

A head pipe 9 is fixed to an upper front end of the body frame 2, and a stem shaft (not shown) which integrally interconnects a top bridge 10 and a bottom bridge 11 is pivotably fitted in the head pipe 9, with a handlebar 12 being fixed on the top bridge 10. Further, on both right and left sides of the head pipe 9, an upper portion of a front fork 13 is inserted and connected to the top bridge 10 and bottom bridge 11, the front fork 13 rotatably supporting a front wheel 14 at its lower end portion. Also provided is a front fender 15.

To right and left sides of a substantially central lower portion of the body frame 2 is connected through a pair of brackets 16 a front end of a rear fork 17 serving as a rear wheel supporting member, the rear fork 17 being swingably connected by means of a pivot member 18. The rear fork 17 rotatably supports a rear wheel 19 at its rear end, and a shock absorber 20 is interposed between an upper portion of the body frame 2 and the rear fork 17, as shown in FIG. 1. The shock absorber 20 performs the function of producing a required damping force by virtue of, for example, resistance of a fluid sealed in the interior of the shock absorber, which resistance is induced when the fluid passes through a valve or the like. Unlike conventional dampers, the shock absorber 20 is not provided with a conventional spring and therefore is substantially reduced in weight in comparison with conventional shock absorbers.

Figure 2:
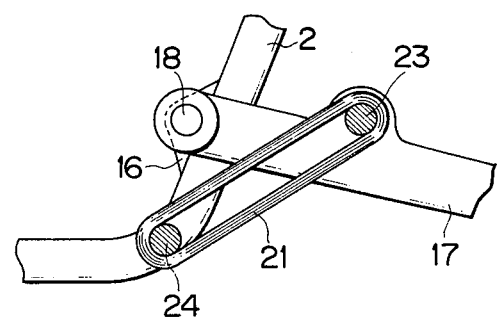
FIG. 2 is an enlarged sectional side view of a principal portion of the rear suspension system including an elastic band, in the motorcycle shown in FIG. 1.
Figure 3:
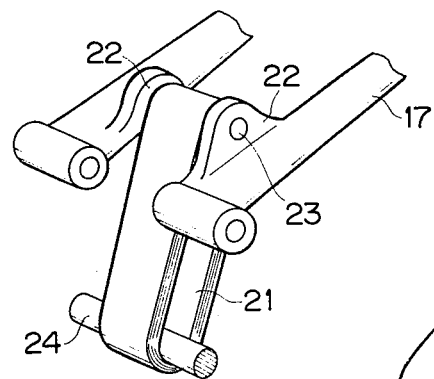
FIG. 3 is a perspective view of the structure shown in FIG. 2.

A ring-like elastic band 21 is mounted between the rear fork 17 and the body frame 2. More specifically, as shown in FIGS. 2 and 3, a pair of brackets 22 are formed to extend in an upright manner on upper front portions of the rear fork 17, and a shaft 23 is mounted in between the brackets 22. On the other hand, between lower corner portions of the body frame 2 is mounted another shaft 24 substantially in parallel with the shaft 23, with the elastic band 21 being stretched between the shafts 23 and 24.

Figure 4:
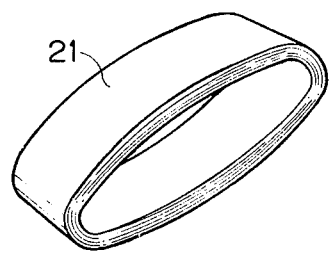
FIG. 4. is a perspective view of the elastic band shown in FIG. 2.

The elastic band 21, as shown in FIG. 4, has a substantially ring-like shape of a substantially single body. With a relatively small quantity of such material, desired elasticity and strength is attained.

The elastic band 21, by virtue of its resilient force, partially bears the weight of the vehicle and that of the rider, and therefore is in a stretched or tensioned state at all times.

When the rear wheel 19 moves up and down in following unevenness of the road surface during travel, vibrations are cushioned by the cushioning action of the elastic band 21 and at the same time are promptly absorbed and cushioned by the damping action of the shock absorber 20, so that the shock and vibration from the rear wheel 19 is substantially prevented from being transmitted directly to the body, thus assuring comfort to at least the same extent as in the conventional type of damper.

In this embodiment, moreover, instead of a metallic spring employed in the conventional type of damper, there is employed the elastic band 21 which is substantially less heavy, thus attaining a reduction of weight to an appreciable extent even when the overall weight of the vehicle is considered, which is not only advantageous with respect to travelling performance but also permits a further enhancing of comfort based on reduction of the unsprung weight.

The damper in the embodiment described hereinabove comprises the shock absorber 20 and the elastic band 21, but if desired, the shock absorber may be omitted by utilization of a damping effect based on hysteresis characteristics of the elastic band, and in this case the weight is even further reduced.

Figure 5:
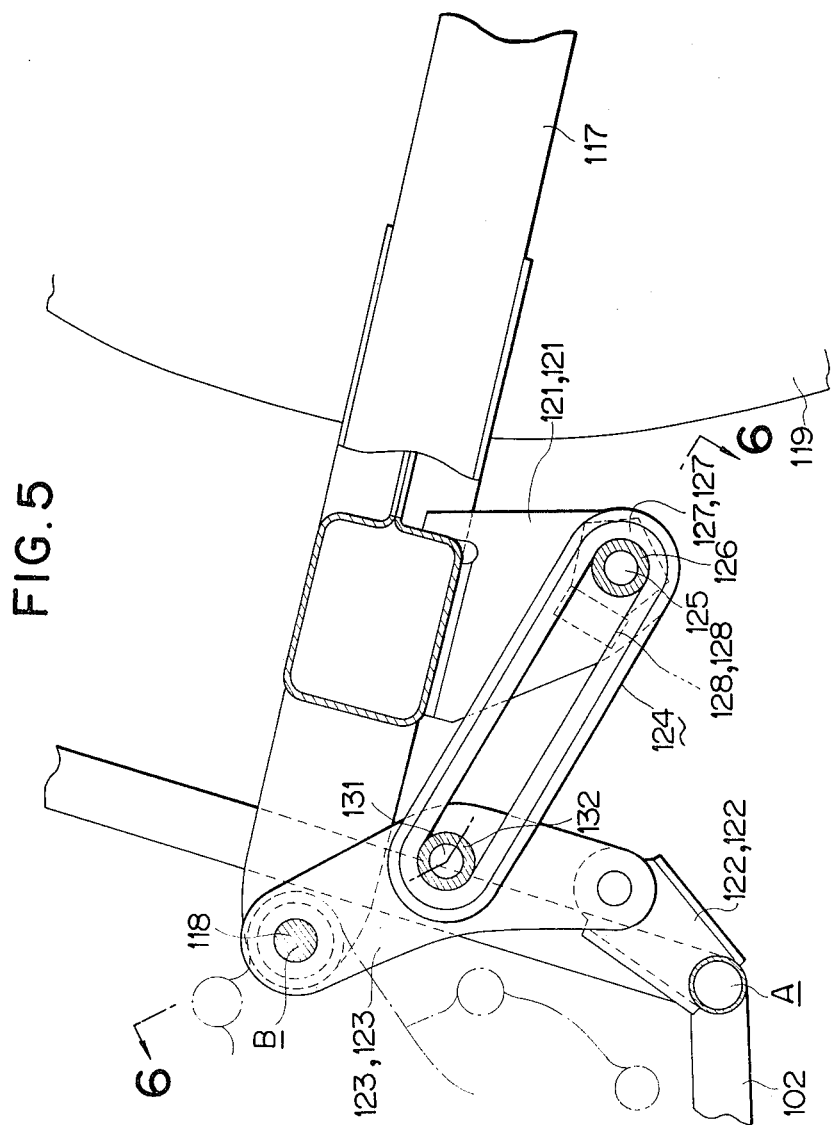
FIG. 5 is a sectional side view of a principal portion of a rear suspension system including an elastic band in a motorcycle, according to a second embodiment of the present invention.
Figure 6:
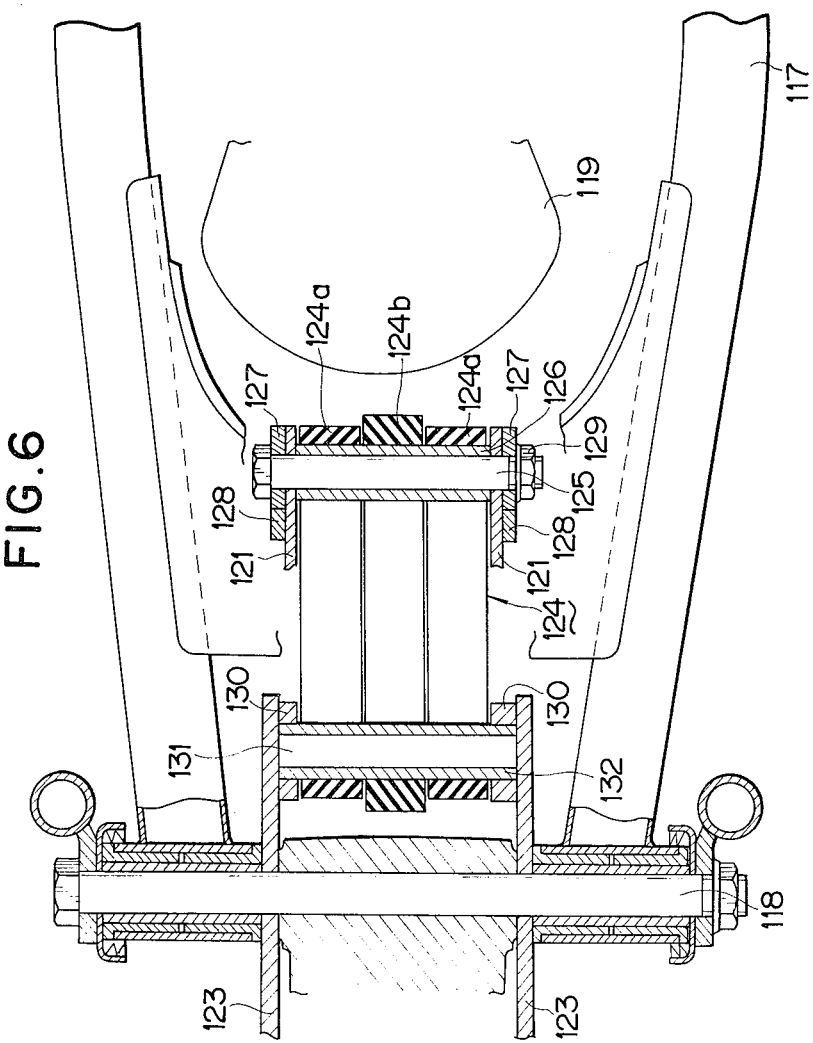
FIG. 6 is a sectional view taken along line 6—6 of FIG. 5.

Referring now to FIGS. 5 and 6, reference numeral 102 designates a body frame of a motorcycle, and reference numeral 124 designates an elastic band which is stretched between the body frame 102 and a rear fork 117 through three pairs of brackets 121, 122 and 123. The elastic band 124, as shown in FIG. 6, comprises a pair of relatively thin right and left spring bands 124a and a relatively thick spring band 124b interposed therebetween.

More specifically, the paired brackets 121 are fixed to a lower front portion of the rear fork 117 in spaced, parallel and opposed relation to each other in the transverse direction of the vehicle, and an elongated hole (not shown) is formed in a lower portion of each of the brackets 121, with a bolt 125 being inserted through the holes. A distance collar 126 is fitted over the outer periphery of the portion of the bolt 125 located between the brackets 121, and the bolt 125 is tightened through adjusting washers 127 mounted on the outer sides of the brackets 121. The fixed position of the collar 126 with respect to the brackets 121 can be easily changed by turning the adjusting washers 127 to change their position of abutment with stopper members 128 fixed to the brackets 121. Further, a nut 129 is threadedly mounted on one end portion of the bolt 125, and by tightening the bolt 125 with the nut 129 the collar 126 is fixed between the brackets 121.

At a lower corner portion of the body frame 102, as shown in FIG. 5, the paired brackets 122 are fixed at the respective lower ends thereof to connection points A in a spaced and substantially parallel relation to each other in the transverse direction of the vehicle. Also, between the upper ends of the brackets 122 and a pivot shaft 118 of the rear fork 117, the paired brackets 123 are mounted and fixed to connection points B so as to be substantially parallel to each other.

To substantially central inner sides of the brackets 123 are fixed ring-like fixing members 130 in opposed relation to each other, as shown in FIG. 6, and a shaft 131 extends therebetween. A distance collar 132 is fitted over the shaft 131 with both ends thereof being fitted in the inner peripheral portions of the fixing members 130. Between the collars 126 and 132 respectively mounted between the brackets 121 and between the brackets 123 are stretched the ring-like spring bands 124a and 124b so as to be side-by-side substantially in the transverse direction of the vehicle.

With the arrangement described hereinabove, even when the rear wheel 119 moves up and down in following unevenness of the road surface, vibrations are cushioned by the cushioning action of the elastic band 124 and at the same time are promptly absorbed and damped by a shock absorber (not shown), so that the shock and vibration from the rear wheel 119 is substantially prevented from being transmitted directly to the vehicle body. Thus, the suspension system according to this embodiment provides a degree of comfort comparable to that afforded by the conventional type of damper.

In this embodiment, moreover, the fixing of the collar 132, which serves as a shaft member for stretching and supporting the elastic band 124, to the brackets 123 is effected by having the collar 132 held by the fixing members 130 without using a bolt connection, thereby permitting simplification and reduction in weight of the suspension system and a facilitated mounting operation.

Further, because in this embodiment a strong tensile force of the elastic band 124 acting on the collar 132 is dispersed to the paired connection points A and connection points B of the brackets 122 and 123, respectively, reaction forces acting on the connection points A and B are substantially reduced and thus the connection strength of the brackets 122 and 123 is significantly increased, or alternatively the brackets 122 and 123 can be so designed as to be of a lesser thickness and weight for the same connection strength, which is more economical.

Figure 7:
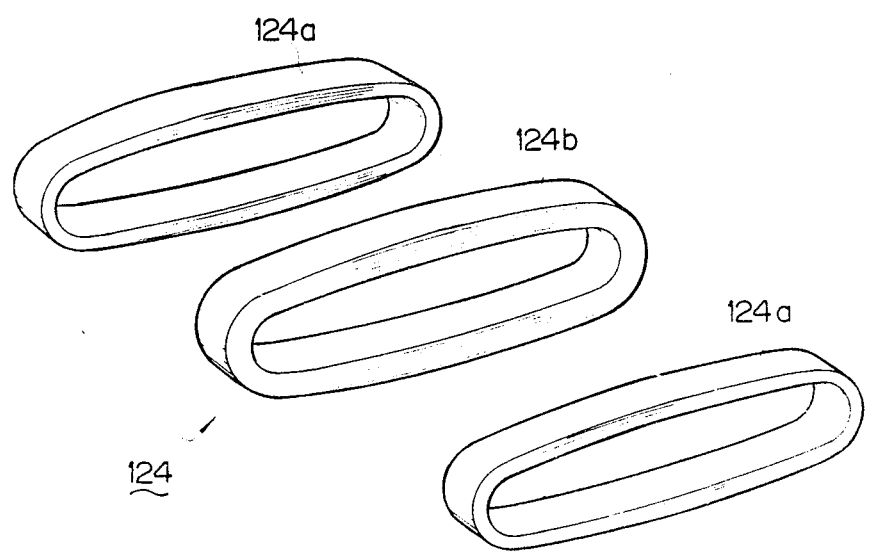
FIG. 7 is an exploded view on a larger scale of the elastic band shown in FIG. 5.
Figure 8:
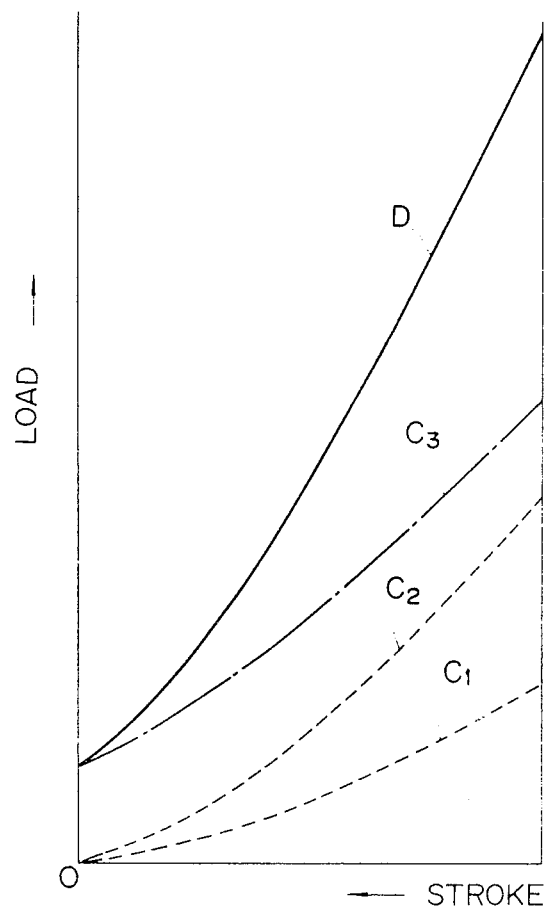
FIG. 8 is a diagram showing spring characteristics of the elastic band shown in FIG. 5.

Referring now to FIGS. 7 and 8, the centrally positioned band 124b having a larger thickness has a spring characteristic as represented by a curve $C_3$ in FIG. 8 and can bear a larger load for the same stroke than the bands 124a positioned on both sides, and therefore the spring constant of band 124b is set at a relatively higher value.

The spring characteristic of the entire elastic band 124 comprising a combination of the substantially parallel bands 124a and 124b having the aforesaid spring characteristic is represented by a curve D composed of curves $C_2$ and $C_3$. Thus, the spring characteristic of the elastic band 124 is represented as a combination of the spring characteristics of its constituent spring bands 124a and 124b. Therefore, the entire spring constant and set load can be changed as necessary by suitably combining bands of different spring characteristics.

The elastic band 124, as shown in FIG. 7, comprises the paired bands 124a having the same thickness disposed on both sides and the centrally disposed band 124b having a thickness larger than that of the side bands 124a. The bands 124a and 124b have a ring-like shape of a substantially single body, and such bands have sufficient resilience and strength.

The band 124a exhibits a spring characteristic such as, for example, the one indicated by curve $C_1$ in FIG. 8. Therefore, if a pair of the bands 124a are employed, there is obtained a composite spring characteristic such as indicated by curve $C_2$, the gradient of which is increased to twice that of the curve $C_1$. FIG. 8 shows spring characteristics of the bands wherein the stroke and load are plotted along the axis of abscissa and that of ordinate, respectively.

Figure 9:
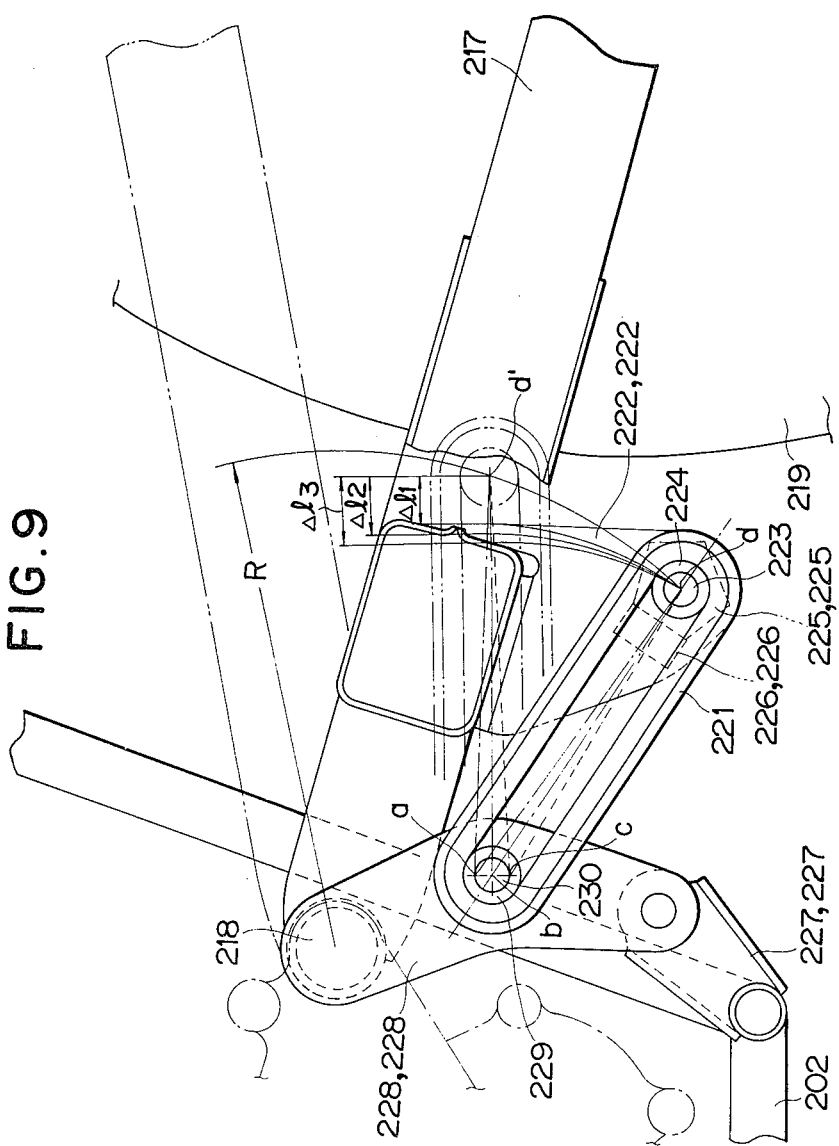
FIG. 9 is a sectional side view of a principal portion of a rear suspension system including an elastic band in a motorcycle, according to a third embodiment of the present invention.
Figure 10:
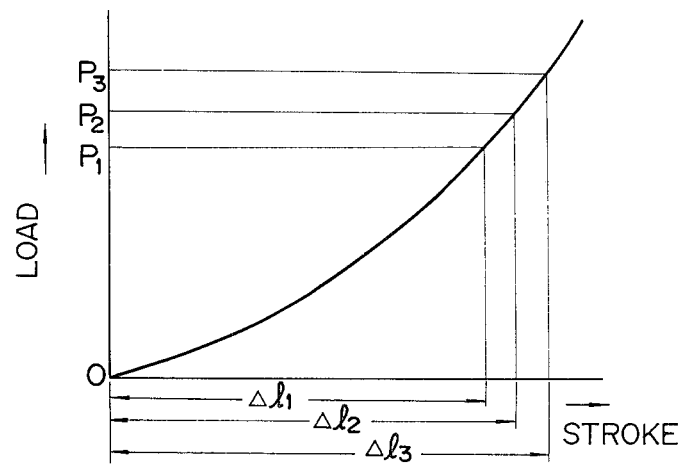
FIGS. 10 and 11 are diagrams showing spring characteristics of the elastic band shown in FIG. 9.
Figure 11:
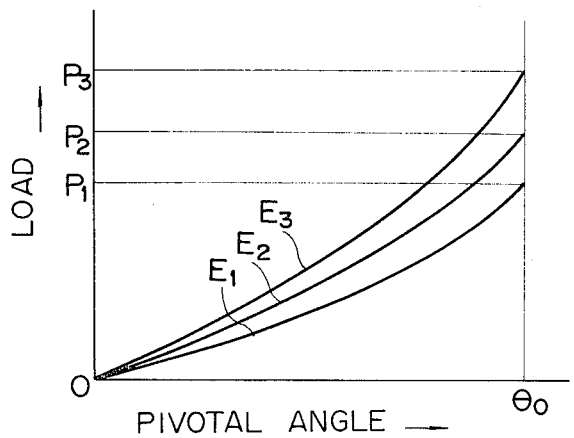

Referring now to FIGS. 9 through 11 and particularly to FIG. 9, there is shown a body frame 202 to which is pivotally secured a front end of a rear fork 217 as a rear wheel supporting member through a bracket and a pivot shaft 218, and a rear wheel 219 is rotatably supported by a rear end portion of the rear fork 217.

Between the body frame 202 and the rear fork 217 is stretched a ring-like elastic band 221, as shown in FIG. 9. More specifically, to a lower front portion of the rear fork 217 are fixed two brackets 222 in spaced, substantially parallel and opposed relation to each other, and an elongated hole (not shown) is formed in a lower part of each of the brackets 222, with a bolt 223 being inserted through such holes. A distance collar 224 is fitted over the outer periphery of the portion of the bolt 223 between the brackets 222, and the bolt 223 is tightened by substantially pentagonal adjusting nuts 225 mounted on the outer sides of the brackets 222. The fixed position of the collar 224 with respect to the brackets 222 can be easily changed by turning the adjusting nuts 225 to change their position of abutment with stopper members 226 fixed to the brackets 222. A nut (not shown) is threadedly mounted on one end portion of the bolt 223, and by tightening the bolt 223 by means of such nut, the collar 224 is fixed between the brackets 222.

To a lower corner portion of the body frame 202 are fixed lower end portions of two brackets 227 which are disposed side-by-side in the transverse direction of the vehicle, as shown in FIG. 9, and two further brackets 228 are disposed substantially in parallel with each other between the brackets 227 and the pivot shaft 218 of the rear fork 217.

Between substantially central portions of the brackets 228 is mounted and fixed a collar 229, in substantially the same manner as the collar 224, by means of a bolt 230 which is inserted through the interior of the collar 229. The collar 229 is also changeable in its fixed position relative to the brackets 228 by means of an adjusting mechanism which comprises an adjusting nut (not shown), etc.

Between the collars 224 and 229 respectively mounted and fixed between the brackets 222 and between the brackets 228 is stretched an elastic band 221. The elastic band 221 bears the weight of the vehicle body and that of the rider to an appreciable extent by virtue of its resilient force, and therefore it is in a stretched or tensioned state at all times.

In the suspension system of the present embodiment, if for example as shown in FIG. 9, one collar 224 is fixed to the brackets 222 and the other collar 229 is made movable from point a to point c with respect to the brackets 228 and its fixed position is changed, the spring constant of the band 221 and the load imposed thereon undergo changes such as shown in FIGS. 10 and 11. FIGS. 10 and 11 illustrate the spring characteristic of the band 221, FIG. 10 showing changes of load versus stroke and FIG. 11 showing changes of load versus pivotal angle of the rear fork 217.

Considering the case where the collar 229 is fixed to the point a on the brackets 228, a fixed point d of the other collar 224 moves while describing a circular locus of a certain radius R about the pivot shaft 218 along with the swinging motion of the rear fork 217. If the elongation (hereinafter referred to as the elongation stroke) between the collars 224 and 229 in case the fixed point d moved to point d' as shown in chain line in FIG. 9 is assumed to be $\Delta l_1$, such stroke $\Delta l_1$ is represented as shown in FIG. 9.

Likewise, if the elongation stroke in the movement of fixed point a to point b and that in its movement to point c are $\Delta l_2$ and $\Delta l_3$, respectively, as also shown in FIG. 9, there exists the following relationship among $\Delta l_1$, $\Delta l_2$ and $\Delta l_3$:

$$\Delta l_1 < \Delta l_2 < \Delta l_3$$

Therefore, with the elastic band having a spring characteristic such as shown in FIG. 10, if the loads on the band at the elongation strokes and $\Delta l_1$, $\Delta l_2$ and $\Delta l_3$ are assumed to be $P_1$, $P_2$ and $P_3$, respectively, there exists the following relationship among the loads $P_1$, $P_2$ and $P_3$:

$$P_1 < P_2 < P_3$$

On the other hand, if the above results are shown in relation to the pivotal angle of the rear fork 217 such as in FIG. 11, because for the same pivotal angle of $\theta_o$ the loads corresponding to the fixed points a, b and c of the collar 229 are $P_1$, $P_2$ and $P_3$, the spring characteristics at the fixed points a, b and c change as shown by curves $E_1$, $E_2$ and $E_3$, respectively. This means that changing the fixed point of the collar 229 is ultimately the same as changing the spring constant of the band 221.

Although reference has bee made hereinabove to the adjustment of the fixed point of the collar 229, if the fixed point of the other collar 224 is adjusted at the same time, the change in spring constant and load of the band 221 becomes more marked. Further, it is highly advantageous to provide for adjustment of the fixed points of the collars 224 and 229 in order to permit effective absorbing of any error in molded dimension of the band 221 itself and/or a dimensional error between mounted parts.

Referring now to FIGS. 12 and 13, there is shown a rear fork 317 which is connected to a body frame 302 through a pivot shaft 318, and a pair of brackets 328 are mounted on the pivot shaft 318. Reference will be made hereinbelow to only one bracket 328.

The bracket 328 has an elongated hole 328a formed therein, and to a lower part thereof is secured a fixing member 326 which has an insertion hole formed substantially centrally therein. As shown in FIG. 13, a bolt 330 is inserted through the elongated hole 328a of the bracket 328, and an opening 332a formed in an upper end of an adjusting rod 332 is fitted over the portion of the bolt 330 projecting from the bracket 328 through a washer 331, and a nut 333 is threadedly fitted on the end portion of the bolt 330 loosely from the outside of the opening 332a. A lower threaded portion 332b of the rod 332 is inserted through the hole 326a of the fixing member 326, and after adjustment of its height, is tightened with lock nuts 334 which are threadedly mounted above and below the fixing member 326. Thereafter, by tightening the nut 333 which is threadedly engaged with the end portion of the bolt 330, the collar 329 is held in a predetermined position.

Another collar 324 is mounted below the front portion of the rear fork 317, and the fixed position thereof relative to the bracket 322 can be adjusted in the same manner as described above by means of a rod 335 and lock nuts 336.

Figure 15:
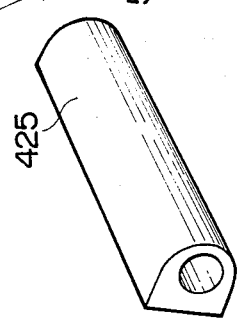
FIG. 15 is an enlarged perspective view of a guide piece in the bearing mechanism shown in FIG. 14.

Referring now to FIGS. 14 and 15 and particularly to FIG. 14, there is shown a body frame 402, and to a substantially central lower part thereof is vertically pivotably secured a front end of a rear fork 415 through a pivot shaft 416, which rear fork 415 rotatably supports a rear wheel 414 as a driving wheel at its rear end. Between the rear fork 415 and the body frame 402 is disposed a shock absorber (not shown) which generates a damping force but does not exhibit a spring action.

To a lower front part of the rear fork 415 is fixed a bracket 418, and a shaft 419 extends through the lower end of the bracket 418 in substantially the transverse direction of the vehicle.

A substantially inverted V-shaped bracket 421 is fixed at its upper end to the pivot shaft 416 and at its lower end to the upper end of a member 420 which is fixed to the body frame 402, and in a substantially central position of the bracket 421 is mounted a shaft 422 substantially parallel to the shaft 419.

A pair of collars 423 are fitted over the outer peripheries of the shafts 419 and 422, and a pair of guide pieces 425 molded at end faces thereof in a substantially semi-cylindrical form substantially conforming to the inner surface dimension of an elastic band 424 as shown in FIG. 15 are fitted over the collars 423 and are rotatable with respect to the shafts 419 and 422. The guide pieces 425 may be formed of either a metal or a synthetic resin.

Between the guide pieces 425 is stretched an elastic band 424 comprising three ring-like spring bands 424a, 424b and 424a such that its inner surface is in close contact with the outer periphery of the guide pieces 425.

When the rear wheel 414 moves up and down in following unevenness of the road surface, the rear fork 415 pivots up and down about the pivot shaft 416, and according to this pivotal movement of the rear fork 415 the distance between the shafts 419 and 422 increases and decreases, thus causing the elastic band 424 to expand and contract, i.e., the elastic band 424 functions as a spring.

Because the elastic band 424 can expand and contract while rotating around the shafts 419 and 422 integrally with the guide pieces 425, no slip occurs between the guide pieces 425, thus effectively preventing deterioration of durability otherwise caused by wear or friction heat, as well as preventing the generation of noise. Particularly, even if foreign matter enters between the elastic band 424 and the guide pieces 425, the elastic band 424 does not undergo wear because no slip occurs therebetween.

Figure 16:
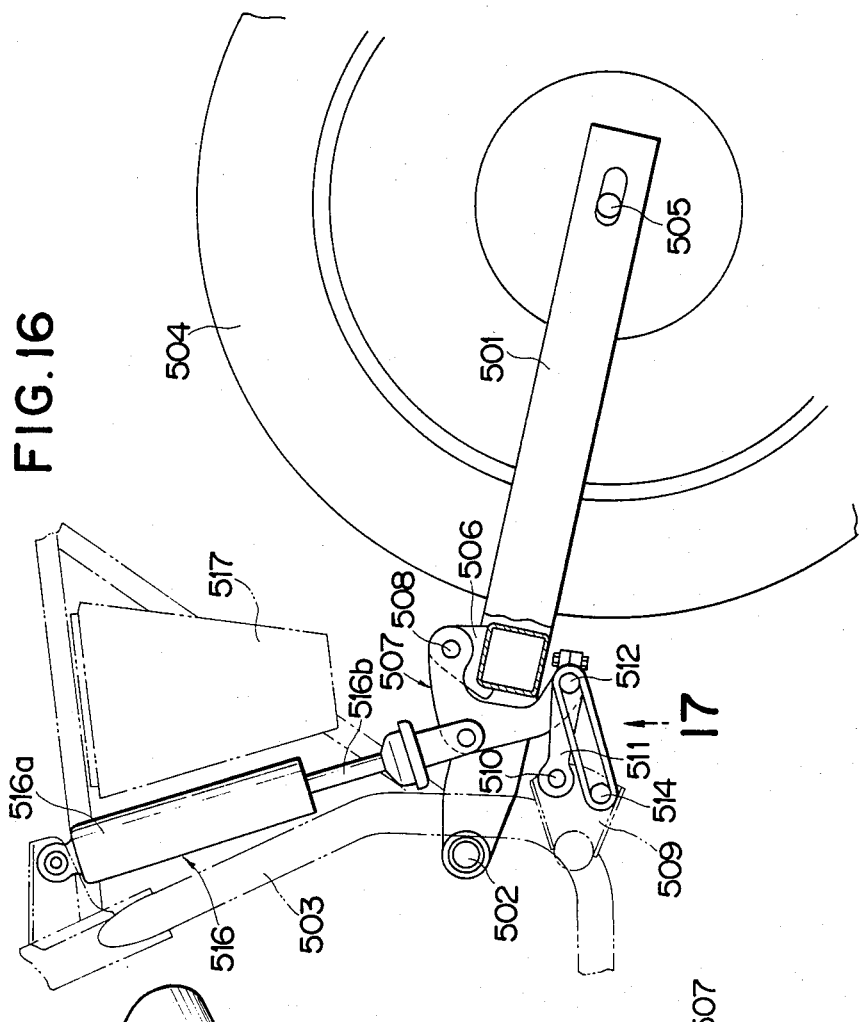
FIG. 16 is a side view of a principal portion of a rear suspension system in a motorcycle, according to a sixth embodiment of the present invention.
Figure 17:
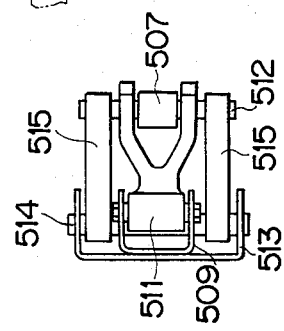
FIG. 17 is a view taken along arrow 17 in FIG. 16.
Figure 18:
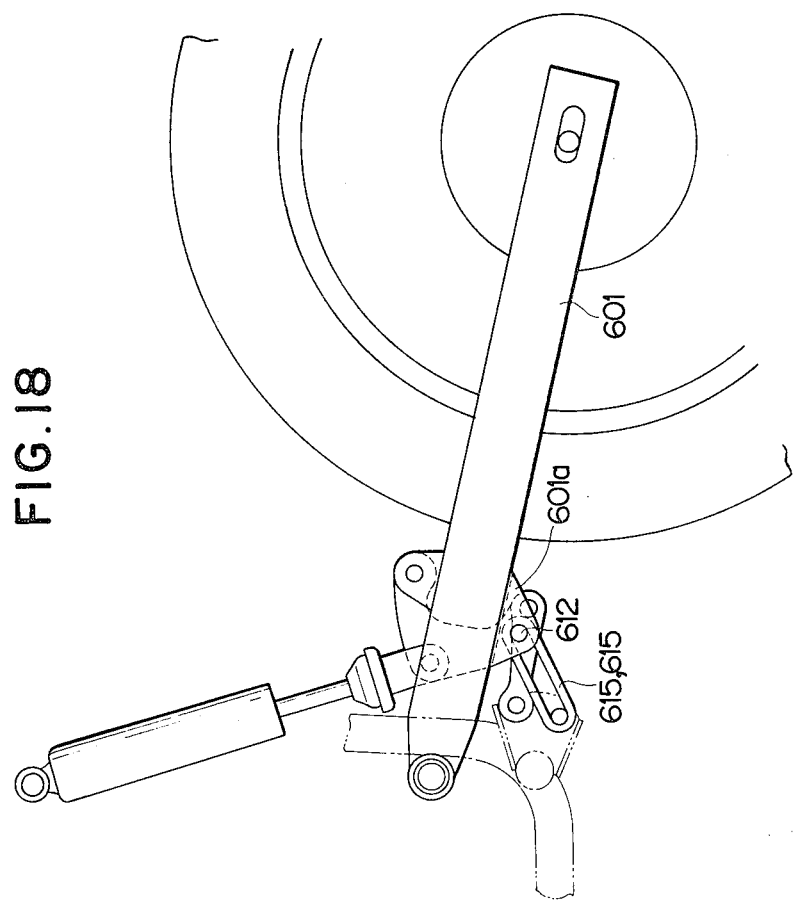
FIG. 18 is a side view of a rear suspension system in a motorcycle according to a seventh embodiment of the present invention.

Referring now to FIGS. 16 through 18, reference numeral 501 in FIG. 16 designates a rear fork vertically pivotably secured at its front end to a body frame 503 through a pivot shaft 502, which rear fork 501 rotatably supports a rear wheel 504 at its rear end through an axle 505. To an upper front portion of the rear fork 501 is fixed a mounting bracket 506, to which is vertically pivotably secured through a pin 508 an upper end of a cushion arm 507 having a substantially V-shape in side elevation. The lower end of the cushion arm 507 is pivotably connected to a bifurcated rear portion of a cushion rod 511 through a pin 512, which cushion rod 511 is secured at its front end to a bracket 509 which is substantially U-shaped in plan, the bracket 509 being fixed to the body frame 503.

To the body frame 503, as shown in FIG. 17, is fixed a wider, substantially U-shaped bracket 513 positioned outside the bracket 509, and a pin 514 is inserted through the bracket 513 in a position below the pin 510. Two ring-like elastic bands 515 are stretched between the pins 512 and 514 on both sides of the cushion rod 511. The elastic bands 515 are formed by winding, lapping and bonding an elastic tape in the form of layers and is extremely light as compared with metallic springs.

A shock absorber 516 is disposed between an intermediate bent portion of the cushion arm 507 and the body frame 503. The shock absorber 516, which is constructed in a known manner, comprises a cylinder 516a and a piston rod 516b, the piston rod 516b being fixed at its upper end to a piston (not shown) slidably inserted within the cylinder 516a. Shock absorber 516 generates a damping force by utilization of a flowing resistance of a fluid sealed within the cylinder 516a, and does not exhibit a spring action.

An air cleaner 517 is attached to the body frame 503 in close proximity to the shock absorber 516.

When the rear wheel 504 moves up and down in following unevenness of the road surface, the rear fork 501 pivots up and down about the pivot shaft 502, and such swinging motion of the rear fork 501 causes a damping force to be generated in the shock absorber 516, which damping force increases in a quadratic curve-wise manner with increase of stroke, and external vibrations are absorbed and cushioned effectively by such damping force.

In this case, because the cushion rod 511 pivots about the pin 510, the distance between the pins 512 and 514 changes, whereby the elastic bands 515 are expanded and contracted and thus exhibit a spring action.

Thus, because the damper is divided into the shock absorber 516 which generates only a damping force and the elastic band 515 which functions as a spring, and especially because the shock absorber 516 is disposed above and the elastic bands 515 are disposed below with respect to the rear fork 501, it is possible to enlarge the area occupied by the air cleaner 517 and other parts, which is advantageous from the standpoint of utilization of mounting space.

FIG. 18 illustrates a modification of the embodiment of the invention shown in FIG. 16. According to this modified embodiment, one pin 612 which supports elastic bands 615 is inserted through a bracket 601a which is fixed to a lower front part of a rear fork 601.

In this modified embodiment, it is possible to attain the same effect as in the embodiment illustrated in FIG. 16. Additionally, by attaching the other end of the elastic band directly to the rear fork, the ratio of the spring stroke to the axle stroke can be made almost constant and a relatively gentle progressive characteristic is attainable. Thus, by changing the mounting position of the elastic band, it becomes possible to optionally and properly select progressive characteristics according to particular purposes.

According to the embodiments illustrated in FIGS. 16 and 18, as is apparent from the foregoing description, in the rear suspension system constituting a so-called progressive link mechanism, the damper is divided into a shock absorber which produces only a damping force and a spring which exhibits only a spring action, and a ring-like elastic band is adopted as the spring. Therefore, it is possible to attain both reduction of weight and an advantageous layout of accessories.

Moreover, by changing the mounting position of the elastic band, it becomes possible to optionally and properly select progressive characteristics according to particular purposes.

Although there have been described what are at present considered to be the preferred embodiments of the invention, it will be understood that the invention may be embodied in other specific forms without departing from the spirit or essential characteristics thereof. The present embodiments are therefore to be considered in all respects as illustrative, and not restrictive. The scope of the invention is indicated by the appended claims rather than by the foregoing description.

I claim:

1. In a two-wheeled vehicle having a body frame and a rear wheel, a rear suspension system comprising:
   a rear fork member;
   said rear fork member having a front portion thereof pivotably connected to said body frame and a rear portion thereof rotatably supporting said rear wheel;
   a ring-like elastic band member stretched between said rear fork member and said body frame; and
   said band member comprising a plurality of spring bands at least one of which has a relatively different spring constant, said spring bands being disposed substantially in parallel with each other.

2. A rear suspension system according to claim 1, further comprising:
   damping force generating means disposed between said body frame and said rear fork member.

3. A rear suspension system according to claim 2, wherein:
   said damping force generating means comprises a damper pivotably connected at one end thereof to said body frame and at the other end thereof to said rear fork;
   said damper is disposed above said rear fork member; and
   said elastic band member is disposed below said rear fork member.

4. A rear suspension system according to claim 1, wherein:
   said band member comprises three said spring bands, two of which have substantially the same thickness, and the remaining one being formed to be relatively thinner.

5. A rear suspension system according to claim 1, wherein:
   said band member is stretched between a first shaft connected proximal said rear fork member and a second shaft connected proximal said body frame in substantially parallel relation with said first shaft.

6. A rear suspension system according to claim 5, wherein:
   said rear fork has a pair of first brackets which are disposed in spaced and opposed relation to each other in substantially the transverse direction of said vehicle, and said first shaft extends between said first brackets.

7. A rear suspension system according to claim 6, wherein:
   said second shaft is fixed to said body frame.

8. A rear suspension system according to claim 6, wherein:
   said rear fork member is pivotably connected to said body frame through a pivot shaft;
   said pivot shaft has a pair of second brackets which are disposed in spaced and opposed relation to each other in substantially the transverse direction of said vehicle; and
   said second shaft extends between said second brackets.

9. In a two-wheeled vehicle having a body frame and a rear wheel, a rear suspension system comprising:
   a rear fork member;
   said rear fork member having a front portion thereof pivotably connected to said body frame and a rear portion thereof rotatably supporting said rear wheel;
   a ring-like elastic band member stretched between said rear fork member and said body frame;
   said band member being stretched between a first shaft connected proximal said rear fork member and a second shaft connected proximal said body frame in substantially parallel relation with said first shaft;
   said rear fork member having a pair of first brackets which are disposed in spaced and opposed relation to each other in substantially the transverse direction of said vehicle, and said first shaft extends between said first brackets;
   said rear fork member being pivotably connected to said body frame through a pivot shaft;
   said pivot shaft having a pair of second brackets which are disposed in spaced and opposed relation to each other substantially the transverse direction of said vehicle;
   said second shaft extending between said second brackets;
   said second brackets comprising a pair of plate members; and
   said plate members being fixed at base ends thereof to said pivot shaft and at tip ends thereof to said body frame through a pair of third brackets.

10. A rear suspension system according to claim 9, wherein:
    said plate members have opposed inner surfaces in opposed positions on which are fixed a pair of ring-like fixing members; and
    said second shaft is held in place by said fixing members.

11. A rear suspension system according to claim 9, wherein:
    said system further includes damping force generating means comprising a damper pivotably connected at one end thereof to said body frame and at the other end thereof to said rear fork;
    said damper is disposed above said rear fork member; and
    said elastic band member is disposed below said rear fork member.

12. In a two-wheeled vehicle having a body frame and a rear wheel, a rear suspension system comprising:
    a rear fork member;

said rear fork member having a front portion thereof pivotably connected to said body frame and a rear portion thereof rotatably supporting said rear wheel;

a ring-like elastic band member stretched between said rear fork member and said body frame;

said band member being stretched between a first shaft connected proximal said rear fork member and a second shaft connected proximal said body frame in substantially parallel relation with said first shaft;

said rear fork member having a pair of first brackets which are disposed in spaced and opposed relation to each other in substantially the transverse direction of said vehicle, and said first shaft extends between said first brackets;

said rear fork member being pivotably connected to said body frame through a pivot shaft;

said pivot shaft having a pair of second brackets which are disposed in spaced and opposed relation to each other substantially the transverse direction of said vehicle;

said second shaft extending between said second brackets; and at least one of said first shaft and said second shaft being adjustable in position.

13. A rear suspension system according to claim 12, wherein:

said first brackets have a pair of elongated holes formed in opposed positions; and said first shaft has both ends thereof slidably inserted through said elongated holes and attached to said first brackets by means of a tightenable element.

14. A rear suspension system according to claim 12 wherein:

said second brackets have a pair of elongated holes formed in opposed positions; and said second shaft has both ends thereof slidably inserted through said elongated holes and attached to said second brackets by means of a tightenable element.

15. A rear suspension system according to claim 12, wherein:

said system further includes damping force generating means comprising a damper pivotably connected at one end thereof to said body frame and at the other end thereof to said rear fork;

said damper is disposed above said rear fork member; and said elastic band member is disposed below said rear fork member.

16. In a two-wheeled vehicle having a body frame and a rear wheel, a rear suspension system comprising:

a rear fork member;

said rear fork member having a front portion thereof pivotably connected to said body frame and a rear portion thereof rotatably supporting said rear wheel;

a ring-like elastic band member stretched between said rear fork member and said body frame;

said band member being stretched between a first shaft connected proximal said rear fork member and a second shaft connected proximal said body frame in substantially parallel relation with said first shaft;

said first shaft and said second shaft being each provided over the outer periphery thereof with a collar portion; and a guide member shaped to substantially fit the inner surface of said elastic band being disposed between said collar member and said elastic band.

17. A rear suspension system according to claim 16, wherein:

said guide member is rotatable around said first shaft or said second shaft.

18. A rear suspension system according to claim 16, wherein:

said system further includes damping force generating means comprising a damper pivotably connected at one end thereof to said body frame and at the other end thereof to said rear fork;

said damper is disposed above said rear fork member; and said elastic band member is disposed below said rear fork member.

* * * * *